Dec. 31, 1935.　　　O. C. PALMER　　　2,026,098
EXPANSIBLE PISTON
Filed Aug. 31, 1933
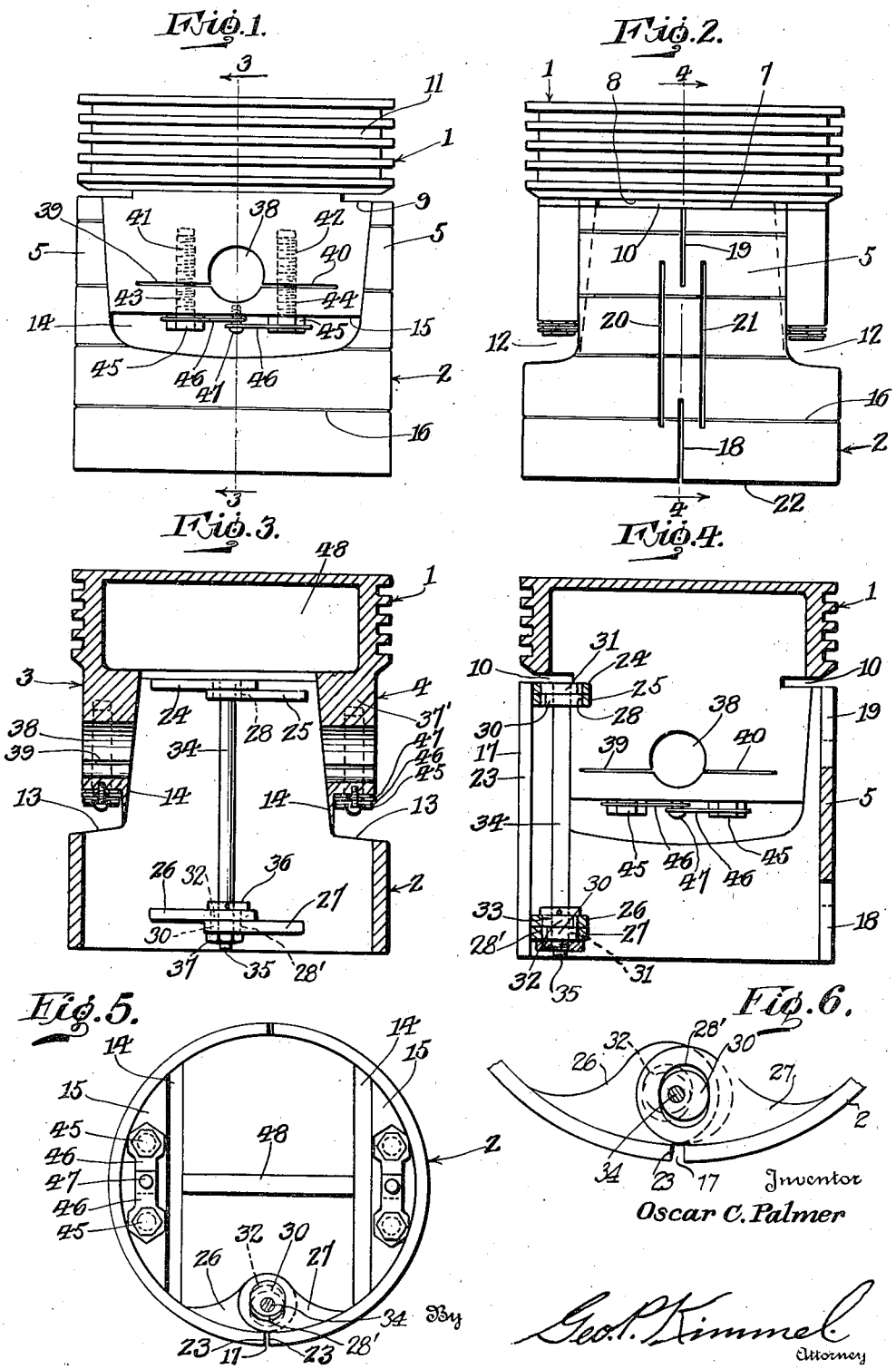
Inventor
Oscar C. Palmer
By Geo. P. Kimmel
Attorney Patented Dec. 31, 1935

2,026,098

UNITED STATES PATENT OFFICE 2,026,098

EXPANSIBLE PISTON

Oscar C. Palmer, Jacksonville, Fla.

Application August 31, 1933, Serial No. 687,698

1 Claim. (Cl. 309—19)

This invention relates to a piston of the expansible skirt type primarily designed for use in connection with engines of the internal combustion type, but it is to be understood that a piston, in accordance with this invention may be employed in any connection for which it may be found applicable, and the invention has for its object to provide, in a manner as hereinafter set forth, a piston including means for adjustment at the points of wear for increasing its life; reducing oil consumption by keeping it in perfect alignment; overcoming the slapping thereof which otherwise would result in the pumping of oil; lengthening the life of the piston rings; eliminating the re-grinding of piston blocks and the necessary replacement of a new piston and pins.

Further objects of the invention are to provide, in a manner as hereinafter set forth, a piston for the purpose referred to, which is comparatively simple in its construction and arrangement, strong, durable, compact, thoroughly efficient for the purpose intended, conveniently adjusted, readily set up, and comparatively inexpensive to manufacture.

To the above ends essentially, and others which may hereinafter appear, the invention consists of such parts, and such combination of parts which fall within the scope of the invention as claimed.

In the drawing:—

Figure 1 is an elevation of the piston looking towards one of the cutout sides thereof.

Figure 2 is a like view looking towards a split side of the skirt.

Figure 3 is a vertical section on line 3—3 Figure 1.

Figure 4 is a section on line 4—4 Figure 2.

Figure 5 is a view looking towards the follower or inner end of the piston.

Figure 6 is a fragmentary view in plan illustrating the skirt of the piston expanded.

The piston is formed of a unitary body comprising a head part 1, a skirt part 2 and a pair of diametrically opposed, oppositely disposed wrist pin receiving parts 3, 4 and which are inset with respect to the head and skirt parts 1, 2 respectively, as well as being integral with the latter. The skirt part has diametrically opposed portions 5 integral with the head part 1. The portions 5 are spaced from each other to form in connection with the free forward edges 7 of the skirt part, the rear free edges 8 of the head part and the free forward edges 9 of the parts 3, 4 oil passages 10. The parts 3, 4 are inset with respect to the outer peripheries of the parts 1, 2. The part 1 is formed with peripheral piston ring receiving grooves 11. The other periphery of part 1 aligns with the outer periphery of part 2, and the latter is cut out at diametrically opposed points, as at 12 to provide clearances for the parts 3, 4. The bottoms of parts 3, 4 are spaced forwardly of the base edges 13 of the cutouts 12. The part 3, as well as the part 4, is formed of a leading portion 37' and a follower portion 14 in the form of a flange. The leading portion 37' is of greater length than the follower portion 14. The leading portion 37' is of materially greater thickness than the remaining portion of the skirt part 2 and merges at its leading end into the head part 1. The leading portion 37' gradually increases in thickness from its follower to its leading end, and the latter extends inwardly with respect to the outer side periphery of head part 1. The follower portion 14 merges into and is arranged inwardly with respect to the outer side face of a leading portion whereby the latter is provided with a follower end edge 15 disposed at right angles to the outer face of the follower portion 14. The said parts 3, 4 are inset throughout with respect to the outer periphery of the head part and the outer periphery of the remaining portion of the skirt part 2. The follower portion 14 is integral with the portion 5 of the skirt part 2. The latter is formed with peripheral oil receiving grooves 16.

The part 2 is completely split from one end to the other end thereof, as at 17. The split extending through a portion 5. That side of part 2 opposite the side which is formed with the split 17 is provided with slits 18, 19, and slots 20 and 21. The slits 18, 19 are arranged in endwise spaced alignment. The slit 18 opens at one end at the rear edge 22 of part 2. The slit 19 opens at one end at the rear edge of one of the oil passages 10. The other ends of the slits are closed. The slots 20 and 21 are arranged in parallel spaced relation and between which extend, in spaced relation the slits 18 and 19. The ends of the part 2 at the slit 17 are indicated at 23.

Formed integral with the inner face of part 2 are two spaced aligning pairs of overlapping arms. The arms of one pair are designated 24, 25 and those of the other pair 26, 27. The arms 24, 25 are formed with aligning openings 28. The arms 26, 27 are formed with aligning openings 29. Arranged in the aligning openings 28' are circular discs 30 each formed with an eccentric opening 31. Arranged in the aligning openings 28' are circular discs 32 each provided with an eccentric opening 33. The openings 31, 33 align with each other. Extending through the aligning openings 31, 33 is a rotatable, adjusting rod 34 which is fixedly secured to the discs 30, 32 and extends from the outer disc 32. The rod 34 has a polygonal shaped outer end 35 to receive a tool for the purpose of rotating rod to expand or retract part 2. The arms, discs and rod referred to provide an eccentric adjusting device for expanding and retracting the skirt part 2. Retaining means for rod 34 are indicated at 36, 37. The slits 18, 19 and slots 20, 21 are provided to take care of the ordinary expansion and contraction after part 2 has been adjusted. The parts 24, 25, 26, 27, 28, 28', 34, 35, 36 and 37 add considerable weight to one side of the piston skirt and a counter weight may be attached on the opposite side of said piston skirt by any approved method of molding or by affixing or attaching a lump of heavier metal.

The leading portion 37' of part 3 or 4 is formed in proximity to its follower end edge 15 with a wrist pin receiving opening 38 and a pair of oppositely disposed slits 39, 40 at right angles to and communicating with the opening 38 in proximity to the inner portion of the wall thereof. Forwardly of and opening into the slits 39, 40, as well as being disposed at right angles thereto, the body part 37' is provided with spaced sockets 41, 42 having threaded walls. The sockets are arranged adjacent opposite sides of opening 38. The body part 37' is furthermore formed with a pair of spaced parallel openings 43, 44 which communicate with slits 39, 40 respectively and align with the sockets 41, 42 respectively. The openings 43, 44 extend from the bottom or rear end 15 of body part 37'.

Extending upwardly through each opening and engaging in each socket is a threaded adjusting screw 45. The slits 39, 40, sockets 41, 42, openings 43, 44 and adjusting screws 45 provide take-up means to compensate for wear of the wrist pin and wrist pin bearings. A pair of lock devices 46 are provided for each pair of screws 45 and which are detachably connected to the bottom or rear end of body part 37', by a holdfast device 47 extending therethrough and engaging in said body part. The locking devices 46 are apertured to surround the heads of screws 45. The parts 3, 4 are termed wrist pin bearings. The head part 1 of the piston is provided with a diametrically disposed reinforcing web or rib 48.

What I claim is:—

A hollow piston comprising a head and a skirt, the latter being formed with a pair of diametrically opposed spaced oppositely disposed like parts of less length than and inset with respect to the remaining part of the skirt, said spaced parts having their leading ends at the leading end of the skirt and extended inwardly with respect to the inner face of the head, each of said spaced parts formed of a thick leading portion and a thin follower portion at the inner side of the follower end of said other portion, the said leading portion being of materially greater length than said follower portion and of materially greater thickness than the said remaining part of said skirt, said spaced parts having aligning wrist pin receiving openings and oppositely extending aligning slits opening at their inner ends into said openings below the horizotal diameters of the latter, and means extending into said leading portions from the follower ends of the latter and adjustable at points inwardly of the outer faces of and at the follower ends of said spaced parts for adjusting the walls of said slits relative to each other for varying the area of said openings.

OSCAR C. PALMER.